(12) United States Patent
Lundberg

(10) Patent No.: US 10,851,496 B2
(45) Date of Patent: Dec. 1, 2020

(54) PROCESS FOR MANUFACTURE OF HIGHLY REFINED CELLULOSE FIBER MATERIALS AND THE NEW FIBERS

(71) Applicant: Brock M. Lundberg, Osseo, WI (US)

(72) Inventor: Brock M. Lundberg, Osseo, WI (US)

( * ) Notice: Subject to any disclaimer, the term of this patent is extended or adjusted under 35 U.S.C. 154(b) by 469 days.

(21) Appl. No.: 15/802,589

(22) Filed: Nov. 3, 2017

(65) Prior Publication Data
US 2019/0136454 A1   May 9, 2019

(51) Int. Cl.
| | |
|---|---|
| D21H 11/20 | (2006.01) |
| C08H 8/00 | (2010.01) |
| D21D 1/20 | (2006.01) |
| D21H 11/18 | (2006.01) |
| D21H 11/12 | (2006.01) |
| C08B 1/02 | (2006.01) |

(52) U.S. Cl.
CPC ............... *D21H 11/20* (2013.01); *C08H 8/00* (2013.01); *D21D 1/20* (2013.01); *D21H 11/12* (2013.01); *D21H 11/18* (2013.01); *C08B 1/02* (2013.01)

(58) Field of Classification Search
USPC ............................................................ 162/9
See application file for complete search history.

(56) References Cited

U.S. PATENT DOCUMENTS

2012/0142909 A1* 6/2012 Lundberg ............... D21C 9/002
536/56

* cited by examiner

*Primary Examiner* — Jacob T Minskey
(74) *Attorney, Agent, or Firm* — Mark A. Litman & Associates, P.A.

(57) ABSTRACT

A reduced energy method produces highly refined cellulose particles from fruit or vegetable mass by providing an initial cellulose mass of particles containing moisture having number average particle diameter of between 0.25 and 1.9 cm and having a moisture content of less than 80% water for the cellulose mass, heating the cellulose mass to between 170 F to less than 212 F to swell and internally shear fiber structure to produce a highly refined cellulose fiber mass having a total dietary fiber (TDF) content greater than 15% as measured by AOAC 991.43 and a water holding capacity greater than three parts water per part fiber as measured by AACC 56-30.

20 Claims, 1 Drawing Sheet

---

PROVIDE A CELLULOSE FIBER MASS OF CITRIC MASS (PREFERABLY LIME AND/OR LEMON

GRIND AND FILTER TO AVERAGE PARTICLE SIZE OF ABOUT 0.25 – 1.9 cm

HAVE FIBER MASS AT LESS THAN 80% TOTAL WEIGHT FIBER/WATER OF MOISTURE

HEAT THE FIBER MASS FOR AT LEAST THIRTY MINUTES AT 170f TO LESS THAN 212f

THE HEATING SWELLING AND SHEARING THE FIBER MASS TO FORM HRC

THE HRC MAY BE REHYDRATED AS NEEDED

| PROVIDE A CELLULOSE FIBER MASS OF CITRIC MASS (PREFERABLY LIME AND/OR LEMON  |
|---|
| GRIND AND FILTER TO AVERAGE PARTICLE SIZE OF ABOUT 0.25 – 1.9 cm  |
| HAVE FIBER MASS AT LESS THAN 80% TOTAL WEIGHT FIBER/WATER OF MOISTURE  |
| HEAT THE FIBER MASS FOR AT LEAST THIRTY MINUTES AT 170f TO LESS THAN 212f  |
| THE HEATING SWELLING AND SHEARING THE FIBER MASS TO FORM HRC  |
| THE HRC MAY BE REHYDRATED AS NEEDED |

PROCESS FOR MANUFACTURE OF HIGHLY REFINED CELLULOSE FIBER MATERIALS AND THE NEW FIBERS

BACKGROUND OF THE INVENTION

1. Field of the Invention

The present invention relates to the field of conversion of agricultural waste products and agricultural excess production mass into broadly useful additive materials (highly refined cellulose) with a broad range of utility.

2. Background of the Art

Many food and agricultural byproducts contain substantial amounts of cellulose. Cellulose is known to be useful in a wide range of markets. The food industry uses cellulose as a fat replacement, a component in products such as dietary fiber supplements, suspension agents, emulsifiers, water binding agents, as well as for edible films and coatings. The pharmaceutical industry uses cellulose as a component in bulking agents and dietary fibers for treatment and prevention of coronary heart disease, Type II diabetes, hypertension, diverticulosis, hemorrhoids, obesity, and so forth. Industrial applications of cellulose include use in filter media, latex paint, and so forth.

Native cellulose fibers contain lignin, a polymeric material found in every type of vascular plant. Prior art processes for refining cellulose seek to remove lignin before any substantive treatment of the fibers. Lignin is known to cause cellulose fibers to stick together, thus reducing the surface area available for any subsequent reactions. It is believed that the presence of lignin also reduces the ability of cellulose microfibers to intertwine and entangle, thus reducing the structural integrity and/or strength of the final product.

U.S. Published patent application 0020060382 describes a process for making lyocell fibers comprising the steps of: (a) contacting a pulp comprising cellulose and hemicellulose with an amount of a reagent sufficient to reduce the degree the of polymerization of the cellulose to the range of from about 200 to 1100 without substantially reducing the hemicellulose content of the pulp; (b) reducing the kappa number of the pulp treated in accordance with step (a) to a value less than about 2.0; and (c) forming fibers from the pulp treated in accordance with steps (a) and (b).

A process described by Turbak et al. (U.S. Pat. No. 4,374,702) for preparation of MFC from wood pulp basically involved a homogenization operation, during which wood pulp was repeatedly passed through a high pressure homogenizer until the suspension becomes a substantially stable dispersion. The homogenizer had a small diameter orifice in which the suspension was subjected to a pressure drop of at least 2000 psi and a high velocity decelerating impact against a solid surface. Homogenization is a very efficient process that converts the fibers into microfibrillated cellulose without substantial chemical change of the starting material. The term "without substantial chemical change" means the fact that the cellulosic material is not intended for uniform chemical modification, such as esterification, acidification, substituent addition, massive molecular breakdown and the like. Homogenizing primarily effects a physical size change, with only potentially modest chemical changes occurring incidentally. Finely divided cellulose is also produced in traditional processes used in manufacturing mechanical pulp, fiberboard and paper pulp. However, these traditional processes involve the use of additional chemical treatment to available cellulose pulps, as for example, acid hydrolysis or mercerization, which chemically alter or degrade the prepared cellulose pulps. In the paper industry, it is well known that paper strength is directly related to the amount of beating or refining which the fibers receive prior to formation. However, beating and refining as practiced in the paper industry are relatively inefficient processes since large amounts of energy are expended to gain relatively minor amounts of fiber opening fibrillation.

Lignin removal from cellulose is currently accomplished using extremely high temperatures and pressures. These extreme conditions cause raw material fragments to break apart, thus releasing the desired cellulose-based micro fibers. In addition, the raw materials are subjected to high concentrations of sodium hydroxide. See, for example, U.S. Pat. No. 5,817,381 to Chen, et al. Such a process is extremely energy-intensive in terms of the required temperatures and pressures. Further, the process produces a waste stream regarded as hazardous due to elevated pH levels caused by the use of large amounts of sodium hydroxide. Treatment of the waste stream adds to the cost of production and impacts the overall efficiency of this process.

An improvement in processes of fiber manufacture and treatment by Lundberg et al. (U.S. Pat. No. 6,506,435) comprises a method for refining cellulose, the process comprising soaking raw material in NaOH having a concentration of about five (5) to 50% (dry basis) to produce soaked raw material which steeps for about 6 hours to allow the NaOH to work, refining the soaked raw material to produce refined material, dispersing the refined material to produce dispersed refined material, and homogenizing the dispersed refined material to produce highly refined cellulose (HRC) gel having a lignin concentration of at least about one (1)% and a water retention capacity (WRC) of about 25 to at least about 56 g $H_2O$/g dry HRC. The method of the Lundberg et al invention produces a waste stream having a pH within a range of 8 to 9 and a reduced volume as compared to conventional cellulose refining processes. In one embodiment, the method further comprises draining and washing the soaked raw material until the pH is down to about 8 to 9, bleaching the washed material at a temperature of about 20 to 100 C in hydrogen peroxide having a concentration of about one (1) to 20% dry basis, and washing and filtering the bleached material to produce a filtered material having a solids content of about thirty percent (30%) The filtered material may be refined by being passed through a plate refiner. The plate refiner essentially breaks up the lignin as it shreds the material into refined cellulose particles. The method of that invention is asserted to be energy efficient because it does not require high pressures and temperatures as in prior art processes. Despite the presence of higher lignin concentrations in the final product, the HRC gel of the Lundberg et al invention has a water holding capacity that is at least as good or better than prior art products. Use of a plate refiner to break up the lignin rather than using high concentrations of NaOH has the added advantage of producing a non-hazardous waste stream having pH within a range of 8 to 9 and a reduced volume.

U.S. Pat. No. 6,083,582 (Chen et al.) describes a process and materials are described in which highly refined cellulose fibers are broken down into microfibers and further processed into compositions, films, coatings and solid materials which are biodegradable and even edible. The process for the formation of hardenable compositions may comprise providing a composition comprising highly refined non-wood cellulose fiber, mechanically reducing the size of the non-wood cellulose fiber to less than 2 mm, reducing the amount of binding of microfibers by lignin within said non-wood cellulose fibers present in said composition comprising cellulose fiber to form a first fiber product, providing pressure of at least 300 psi to said first fiber product while it is in the presence of a liquid, and removing said pressure within a time interval which will cause said cellulose fiber to break down into a second fiber product comprising microfibers in said liquid. The Patent describes edible foodstuff wherein material having nutritional value is coated, wrapped or coated and wrapped with a film of material made from the fibers of the Patent.

U.S. Pat. No. 6,231,913 (Schwimmer) describes a pre-emulsion fiber composition (i.e., the mixture formed from an oil and mixture that can be formed into an oil-in-water emulsion using standard emulsification equipment known by those of skill in the art, such as a high-pressure, ultrasonic, or other homogenizer, a rotator/stator device, and like equipment. The pressure employed, the shear rate, and/or the time of emulsification may vary widely depending upon the particular equipment employed. The pressure employed when homogenizers are used for the emulsification will generally range from about 130 psi to about 220 psi, with about 180 psi being preferred. When equipment other than homogenizers is used for the emulsification, the shear rate employed will generally range from about 9,000 to about 100,000 reciprocal seconds. The emulsification time will generally range from about 1 second to about 10 minutes, but may be higher, depending upon whether the emulsification is performed in a single pass, or in multiple passes, and will more usually range from about 2 seconds to about 30 seconds.

These processes use large volumes of water, create a fiber mass to be refined that contains large volumes of water as carriers and as absorbed materials, and therefore require large amounts of energy to dry the fibers to create a stable and final highly refined cellulose material.

In spite of the improvements in cellulose fiber manufacture and properties that are provided among these various processes and materials can still be improved upon. Additionally, the processes, even if they are improved with regard to their environmental friendliness, it would be desirable if the processes could be further simplified, improved to produce more functional products, and produce fewer and less harmful by-products.

SUMMARY OF THE INVENTION

Pre-drying a cellulosic mass from fruits and/or vegetables. The pre-dried mass is then ground to a relatively narrowly uniform size range of 0.1 inch to 0.75 inches (number average), preferably with less than +0.5% of the ground segments above 0.75 inches. Adding sufficient water to the ground cellulosic mass to provide a total water content of between 20% to 85% total weight to the remoisturized ground cellulosic mass. Heating the remoisturized cellulosic mass at 170 F to 212 F for sufficient time to expand or swell the remoisturized cellulosic mass The expanded remoisturized cellulosic mass may then be sheared (or not) to further expand the fiber mass to a final refined cellulosic fiber final mass. The resultant final mass can then be sized to be compatible with specific fields of use.

BRIEF DESCRIPTION OF THE FIGURES

FIG. 1 shows a flow diagram summarizing a process according to the present invention.

DETAILED DESCRIPTION OF THE INVENTION

The present invention applies to the specialized treatment of any fibrous raw cellulosic materials, especially those from fruits and vegetables, and more particularly to cellulosic fiber mass having a high (at least 5% total weight) of parenchymal cell wall mass, the cellulosic fiber mass preferably containing residual amounts of hemicellulose or pectin. Not to be bound to any particular theory, but one hypothesis as to why the present process works successfully is that heating the moistened raw materials enables the pectin and hemicellulose to disperse and disentangle from the cell walls of the fibrous raw materials enabling the pectin and hemicellulose to create functional properties, e.g., water holding capacity, swelling capacity, gelling, oil binding, and/or viscosity adjustment that amplifies the physical structural effects of the highly refined fiber mass itself. It is theorized that functionality is superior when using this process because the pre-dried materials are friable and readily dry without agglomerating (as do undried cellulosic mass, even when ground), thereby maintaining their high water holding capacity after the drying process.

A highly refined cellulose material as produced by the present technology is defined as having a fiber material that has a total dietary fiber (TDF) content greater than 15%, or greater than 20%, or greater than 25% or greater than 30% as measured by AOAC 991.43 and a water holding capacity greater than three, four or five parts water per part fiber as measured by AACC 56-30, followed literally or with the modification of testing a 2.5 gram fiber sample instead of a 5 gram fiber sample, and is less than 50%, 75% or less than 90% soluble fiber. These standardized tests are well established in the scientific community and enabled as background information to those of ordinary skill in the art.

As a theoretical example of the significance of using a low moisture process with a moisture content of 50%, when pre-dried materials of the present invention are dried, the amount of water needed to make 100 pounds of dried materials would be 100 pounds of water. Compared to most HRC materials that have a pre-dried moisture content of 90%, 95% (or higher), the amount of moisture needing to be dried is 2000 pounds of water to make 100 pounds of dry fiber. Thus, with the present invention there is up to a 95% savings (100 pounds vs 2000 pounds of water) in drying energy costs while still attaining the same functional properties of the high moisture process.

One aspect of the present technology is to expand the cell wall fiber structure of fibrous materials such that they have a high water holding capacity, oil binding capacity, and viscosity, using lower energy expenditure, while the manufacturing process has lower water use requirements. Additional aspects of the technology are to reduce energy costs typically associated with processing and drying fibrillated cellulose materials along with the loss or at least reduction of functionality. That loss is typically encountered when drying fibrillated products as they tend to agglomerate during drying when there is relatively high amount of water present.

General Descriptions:

The raw materials used in the present invention should be dried using convention drying means or at least dewatered (centrifuging, pressing, etc.) so that there that amount of moisture is minimized before the process of cell wall expansion begins. That starting moisture level should be less than 70% of the total mass of cellulose fiber (dry weight), preferably less than 50%, less than 40% and less than 25% or less than 15% by weight of the cellulose fiber mass. Typical starting moisture content would be around 8-10% with an average of 9%. The reason if that if cell wall expansion occurs in the presence of significant amounts of water, the only way that remaining water can be removed is via dehydration using alcohol or other form of evaporative drying rather than dewatering mechanically, as by using pressing or centrifugation. Any citrus fruit may be used, but lemon, grapefruit, orange and lime are preferred.

Swellability is determined as follows. 454 g of highly refined cellulose fiber derived from lemon peel (having a moisture content of 10% by weight water to solids) manufactured according to Example 1 of the present application was placed as a flat layer across the entire bottom of a 6 inch by 8 inch a Pyrex® tray with lines marking orthogonal dimensions, with individual pieces separated for ease of viewing by human eyes, with or without magnification. The dimensions (length and width) were measured before remoisturization. 225 grams of distilled water at 210 F was poured into the tray and the lemon-based HRC was allowed to sit for 60 minutes in an insulated environment to reduce cooling of the water. The thickness of the remoisturized cellulose fiber layer was at least 14% and usually at least 25% in one dimension. The variation in dimension expansion is due in part because of the different original physical structure in particles of the peel, and usually at least about 20% greater than the original refined cellulose fiber layer at 10% moisture content.

Swelling of Lemon Fiber During Heat/Steam Processing

Lemon fiber had about 50% added moisture. Heat treatment was done for one hour at 210 F. Average size measurements were taken on the particles as they were noy symmetrical.

| Fiber | Length Before (inch) | Length After (inch) | % growth | Width Before (inch) | Width After (inch) | % growth |
|---|---|---|---|---|---|---|
| 1 | 0.314 | 0.563 | 79% | 0.125 | 0.188 | 50% |
| 2 | 0.375 | 0.500 | 33% | 0.125 | 0.125 | 0% |
| 3 | 0.313 | 0.500 | 60% | 0.125 | 0.188 | 50% |
| 4 | 0.500 | 0.625 | 25% | 0.063 | 0.063 | 0% |
| 5 | 0.438 | 0.500 | 14% | 0.125 | 0.250 | 100% |
| | | | 42% | | | 40% |

Step 1:

To help improve a consistent amount of cell wall expansion that occurs during processing with heating, shearing, and drying, the dry cellulosic fiber mass materials should first be ground to a relatively uniform particle size, e.g., 0.1-0.75 inch segments (0.254-1.87 cm), which can be done using any conventional means, i.e., hammer mill, shear pump, ball mill grinding, and other physical grinding techniques, etc.

Step 2:

A small/minimal amount of moisture should be added to the dry materials to help enable swelling of the dry fiber materials. Typical amounts of moisture added in the present invention were enough to adjust the moisture content of the moist materials from 20% to 85%, 25% to 75%, 30% to 60%, and preferably 50% or less moisture (to no less than 20%). This is much less moisture compared to the inventions outlined in the prior art, which were typically processed at 90-99% moisture, typically 95-97%% moisture. These higher levels of moisture are the results of saturation by aqueous solutions and even shearing in a fully aqueous environment.

Step 3:

The low moisture content cellulosic particulate materials produced in step 2 should be next heated at 170 F to 212 F for a period of time to enable swelling of the fiber structure. Typical heating times are from 15 minutes to 4 fours, typically 45 min to 1:15 min. Heating can take place in a jacketed vessel by conduction or convention heating, infrared heating or a direct injection steam process. With steam, the inventor has actually measured variation in moisture content and has typically seen a 10-15% increase in moisture. In other words, if the initial moisture before steam treatment is 50%, after steam treatment the moisture content would range between 60-65%.

Step 4:

After heating takes place, the fiber structure has been swollen and can then optionally be sheared. Not shearing the fiber will still result in high functional properties. However, shearing (at high speeds, in its present moisture content state, or in a more moist or wet environment) will improve the rehydration properties. Shearing can take place in any type of equipment, e.g., waring blender, kneader, extruder, shear pump, rotor stator mixer, even a hammer mill if the materials are dry enough.

Step 5:

Once the materials are swollen and expanded, they can then be dried using any means known in the art. Examples of drying equipment are convective dryers, e.g. fluid bed dryer, flash dryers, belt dryers, infrared drying in batch or continuous form, or extraction of the water chemically with an organic solvent, e.g., isopropyl alcohol (IPA) or ethanol.

Step 6:

After drying, the products should can then be particle sized using any well-known equipment to size the materials appropriately for the application they are going into. Milling equipment options include hammer mills, air swept mills, ball mills, and pin mills.

Measurements

Water Holding Capacity:

Water holding capacity was measured following a scientifically standard testing procedure, AACC 56-30 with the variation that a 2.5 gram of the sample was used for the step one measurement rather than 5.0 grams.

Viscosity:

The following steps outline the procedure for testing the viscosity of processed fibrous products. First, hydrate the fiber sample using 15 grams of fiber and 485 grams of water to make a 3% by weight solids to the total solution in a Waring blender (Model S1BL30 (7010)) placed on low speed for 180 seconds. Second, measure the viscosity using a Brookfield (LV) DV II+ viscometer using cylindrical spindles (typically S61, S62, or S63) at 10 rpm at room temperature (25 C±3 C). Viscosity was measured at 0.5 hours after rehydration.

Swelling Capacity:

To measure swelling Capacity of the various fibers, 0.2 grams of the fiber sample was added to 10 milliliters (ml) of room temperature distilled water in a graduated cylinder and allowed to sit for 5 minutes. Swelling capacity was calculated by recording final volume (ml) of the swollen fiber sample divided by weight (g) of initial sample.

Example 1

Orange peel materials were ground to a relatively uniform particle size and filtered using a ⅜" screen in a Fitzmill™ grinder to make particles that ranged from 1/16" to ⅜" in size with an average of approximately ¼". Add water, including any one of tap water, distilled or deionized water to adjust the moisture content of the materials to 50% moisture and mix until the moisture is uniformly distributed. Next heat the materials in a heated vessel, e.g., sauce pan on a heating element such as a hot plate or an oven, vegetable steamer, heated blender, jacketed mixing vessel, pressure cooker, or a rice cooker until they reach ~210 F and hold for one hour. Once steamed, place the materials in a kitchen blender for three minutes to be sheared. After shearing, the products are dried in a tray dryer at 14 F for 3-4 hours or until dry. Finally, mill the dried materials in a Wiley mill using a 20 mesh screen. Measuring viscosity was performed to determine a 3% Brookfield viscosity and five-minute swelling capacity. The results were a Swelling capacity: 14 ml/g and Viscosity: 2030 cP.

Example 2

Lime peel materials were ground to uniform particle size between about one-quarter and three-quarters of an inch using a ⅜-inch screen in a Fitzmill™ grinder. Add water to adjust the moisture content of the materials to 40% moisture and mix until the moisture is uniformly distributed. Next heat the materials in a pan until they reach ~210 F and hold for one hour. Once steamed, place the materials in a kitchen blender for three minutes. After shearing, dry the products in a tray dryer at 140 F for 3-4 hours or until dry. Finally, mill the dried materials in a Wiley mill using a 20 mesh screen. Measure 3% Brookfield viscosity and five-minute swelling capacity. The results were a Swelling capacity: 15 ml/g and Viscosity: 6890 cP and Water holding capacity: 6.77 grams water per gram.

Example 3 (Non Invention)

As a point of comparison, when both heat and shear are not used in the process, the lime peel materials were ground to uniform particle size of ⅛" using a 0.033" screen in a Fitzmill™ grinder. Neither water was added nor heat or shear applied to the ground materials. The materials were dried in a fluid bed dryer and the dried materials ground in a Wiley mill using a 20 mesh screen. Measured 3% Brookfield viscosity and five-minute swelling capacity and found Swelling capacity: 11 ml/g and Viscosity: 234 cP. These low values show the benefits of the present invention with more than an order of magnitude difference in viscosity and higher swelling capacity.

Example 4

Lime peel materials were ground to uniform particle size of approximately ⅛" using a 0.033-inch screen in a Fitzmill™ grinder. Add water to adjust the moisture content of the materials to 50% moisture and mix until the moisture is uniformly distributed. Next heat the materials in a heated vessel, i.e. sauce pan on an oven, vegetable steamer, heated blender, jacketed mixing vessel, pressure cooker, or a rice cooker until they reach ~210 F and hold for one hour. Once steamed, immediately dry the materials without shearing. Dry the products in a tray dryer at 140 F for 3-4 hours or until dry. Finally, mill the dried materials in a Wiley mill using a 20 mesh screen. Measure 3% Brookfield viscosity and five-minute swelling capacity. Results were Swelling capacity: 11.0 ml/g, Viscosity: 4830 cP.

Example 5

Grind dry lime peel that were dried using a conventional rotary dryer materials to uniform particle size using a 0.033-inch screen in a Fitzmill™ grinder to form particles averaging ⅛" in size. Add water to adjust the moisture content of the materials to 60% moisture and mix until the moisture is uniformly distributed. Next heat the materials in a pan until they reach ~210 F and hold for one hour. Once steamed, place the materials in a kitchen blender for three minutes. After shearing, dry the products in a tray dryer at 140 F for 3-4 hours or until dry. Finally, mill the dried materials in a Wiley mill using a 20 mesh screen. Measure 3% Brookfield viscosity and five-minute swelling capacity. Swelling capacity: 12.5 ml/g Viscosity: 5890 cP Example 6

Dry (less than 25% total moisture content) lime peel materials were ground to uniform particle size using a 0.033" screen in a Fitzmill™ grinder to attain particles averaging ⅛" in size. Add water to adjust the moisture content of the materials to 40% moisture and the ingredients mixed until the moisture is uniformly distributed. Next the materials were heated in a pan until they reached ~210 F and hold for one hour. Once steamed, place the materials in a kitchen blender for three minutes. After shearing, dry the products in a tray dryer at 140 F for 3-4 hours or until dry. Finally, mill the dried materials in a Wiley mill using a 20 mesh screen. Measure 3% Brookfield viscosity and five-minute swelling capacity with results of Swelling capacity: 12.0 ml/g and Viscosity: 4830 cP.

Example 7

Dry lemon peel materials with an average beginning moisture content of 9% were ground to uniform particle size using a ⅜-inch screen in a Fitzmill™ grinder. Add water to adjust the moisture content of the materials to 40% moisture and mix until the moisture is uniformly distributed. Next heat the materials in a pan until they reach ~210 F and hold for one hour. Once steamed, place the materials in a kitchen blender for three minutes. After shearing, dry the products in a tray dryer at 140 F for 3-4 hours or until dry. Finally, mill the dried materials in a Wiley mill using a 20 mesh screen. Measured 3% Brookfield viscosity and five-minute swelling capacity, with results of Swelling capacity: 17.5 ml/g, Viscosity: 5510 cP and Water holding capacity: 7.04 grams water per gram.

Example 8

Dry then grind orange peel materials to a uniform particle size using a ⅜" screen in a Fitzmill™ grinder to attain particles averaging ⅛" in size. Add water to adjust the moisture content of the materials to 50% moisture and mix until the moisture is uniformly distributed. Next heat the materials in a pan until they reach ~210 F and hold for one hour and fifteen minutes. Once steamed, place the materials in a kitchen blender for three minutes. After shearing, dry the products in a tray dryer at 140 F for 3-4 hours or until dry. Finally, mill the dried materials in a Wiley mill using a 20 mesh screen. Measured 3% Brookfield viscosity and five-minute swelling capacity, with results of Swelling capacity: 13 ml/g, Viscosity: 2650 cP.

Example 9

Grind dried orange peel materials with an average moisture content of 9% to uniform particle size using a ⅜" screen in a Fitzmill to attain particles averaging ¼" in size. Add water to adjust the moisture content of the materials to 50% moisture and mix until the moisture is uniformly distributed. Next heat the materials in a pan until they reach ~210 F and hold for one hour and fifteen minutes. Once steamed, place the materials in a kitchen blender for three minutes. After shearing, dry the products in a tray dryer at 140 F for 3-4 hours or until dry. Finally, mill the dried materials in a Wiley mill using a 20 mesh screen. Measure 3% Brookfield viscosity and five-minute swelling capacity.

Swelling capacity: 15 ml/g
Viscosity: 2850 cP

Prior Art Process from US Published Application Document No. 20050274469 (Lundberg)

Dried beet pulp shreds were obtained from a local feed store. The beet pulp was then ground to a powder using a disk mill or refiner. One particularly useful plate refiner is manufactured by Sprout Waldron of Muncy, Pa. and is Model 12-ICP. This plate refiner has a 60 horsepower motor that operates at 1775 rpm. After the dry materials were ground, they were soaked in hot water at 100 C for 5 minutes at 5% solids, where the materials started to absorb moisture. The soaked materials were then washed with water in a screen cart to remove any unwanted particulate or soluble materials. After soaking, the materials were diluted to 3% solids and bleached in a 150 gallon tank with agitation. The bleaching conditions were 15% hydrogen peroxide (based on dry matter weight), a pH of 11.5, and a temperature of 80 C for one hour. After bleaching, the material was then washed in a screen cart. After bleaching, the materials were then refined again at 3% solids using the same refiner in the first step, which was followed by further reducing particle sizes in an IKA Dispax Reactor, Model DR 3-6A (Wilmington, N.C.). The dispersed materials were then homogenized three times at 8000 psi (approximately $5 \times 10^5$ sec$^{-1}$ shear rate) using a APV Gaulin high pressure homogenizer, Model MC(P)-45 (Wilmington, Mass.). The homogenized materials were then dried at 120 F in a Harvest Saver Dehydrator made by Commercial Dehydrator Systems (Eugene, Oreg.). The dried materials were then ground in a Fitzmill, Model D6 (Elmhurst, Ill.), with a 0.050 inch round 22 gauge 316-mesh stainless steel screen. After grinding, the ground materials were then rehydrated at 1% solids using a standard kitchen household blender on high speed for three minutes. Viscosity was then measured using a Brookfield LVDV++ viscometer (Middleboro, Mass.) with cylindrical spindles. Keltrol™ xanthan and propylene glycol alginate (PGA) were obtained from CP Kelco. 1% solutions were made by mixing the materials in a blender for 3 minutes. Rheology was determined using the same Brookfield viscometer. This data shows that the fibers of the invention are capable of providing a viscosity of at least 23,000 at a concentration of 1% fibers derived from sugar beets at 1 rpm at 20 C. It is within the skill of the artisan using the teachings of this invention to provide viscosities of greater than 24,000 and greater than 25,000 at these concentrations and conditions to produce the parenchymal cell based highly refined cellulose fibers of the invention.

What is claimed:

1. A reduced energy method of producing highly refined cellulose particles from lemon fruit or lime fruit mass comprising:
   providing an initial cellulose mass of lime or lemon cellulose particles containing moisture having number average particle diameter of between 0.25 and 1.9 cm and having a moisture content of less than 80% water for the cellulose mass, heating the cellulose mass to between 170 F to less than 212 F to swell and internally shear fiber structure to produce a highly refined cellulose fiber mass having a total dietary fiber content greater than 15% as measured by AOAC 991.43 and a water holding capacity greater than three parts water per part fiber as measured by AACC 56-30.

2. The method of claim 1 wherein the highly refined cellulose fiber mass was subjected to high shear after the cellulose mass was heated for more than 15 minutes.

3. The method of claim 1 wherein after providing the cellulose mass of particles containing moisture having number average particle diameter of between 0.25 and 1.9 cm and having a moisture content of less than 80% water for the cellulose mass, during the entire method, the moisture content never rises to above 80%.

4. The method of claim 3 wherein the cellulose mass is initially provided with a moisture content of 20-60%.

5. The method of claim 4 wherein after providing the initial cellulose mass of particles containing moisture having number average particle diameter of between 0.25 and 1.9 cm and having a moisture content of less than 80% water for the cellulose mass, during the entire method, the moisture content never rises to above 60%.

6. The method of claim 3 wherein the initial cellulose mass comprises mass from lime or lemons and is provided with a moisture content of 30-50%.

7. The method of claim 3 wherein the highly refined cellulose fiber mass comprises mass from lime or lemons that was subjected to high shear after the cellulose mass was heated for more than 15 minutes.

8. The method of claim 4 wherein the highly refined cellulose fiber mass comprises mass from lime or lemons that was subjected to high shear after the cellulose mass was heated for more than 15 minutes.

9. The method of claim 5 wherein the highly refined cellulose fiber mass was subjected to high shear after the cellulose mass was heated for more than 15 minutes.

10. The method of claim 6 wherein the highly refined cellulose fiber mass comprises mass from lime or lemons that was subjected to high shear after the cellulose mass was heated for more than 15 minutes.

11. The method of claim 3 wherein the initial cellulose mass provided comprises at least 80% by total solids weight of citric fruit mass.

12. The method of claim 4 wherein the initial cellulose mass provided comprises at least 80% by total solids weight of citric fruit mass.

13. The method of claim 5 wherein the initial cellulose mass provided comprises at least 80% by total solids weight of citric fruit mass.

14. The method of claim 6 wherein the initial cellulose mass provided comprises at least 80% by total solids weight of citric fruit mass.

15. The method of claim 7 wherein the initial cellulose mass provided comprises at least 80% by total solids weight of citric fruit mass.

16. The method of claim 1 wherein the initial cellulose mass provided comprises at least 80% by total solids weight of lemon and or lime citric fruit mass.

17. The method of claim 2 wherein the initial cellulose mass provided comprises at least 80% by total solids weight of lemon and or lime citric fruit mass.

18. The method of claim 3 wherein the initial cellulose mass provided comprises at least 80% by total solids weight of lemon and or lime citric fruit mass.

19. A reduced energy method of producing highly refined cellulose particles from fruit or vegetable mass consisting essentially of:

providing an initial cellulose mass of particles containing moisture having number average particle diameter of between 0.25 and 1.9 cm and having a moisture content of less than 80% water for the cellulose mass, heating the cellulose mass to between 170 F to less than 212 F to swell and internally shear fiber structure to produce a highly refined cellulose fiber mass having a total dietary fiber (TDF) content greater than 15% as measured by AOAC 991.43 and a water holding capacity greater than three parts water per part fiber as measured by AACC 56-30.

20. A reduced energy method of producing highly refined cellulose particles from fruit or vegetable mass consisting of:

providing an initial cellulose mass of particles containing moisture having number average particle diameter of between 0.25 and 1.9 cm and having a moisture content of less than 80% water for the cellulose mass, heating the cellulose mass to between 170 F to less than 212 F to swell and internally shear fiber structure to produce a highly refined cellulose fiber mass having a total dietary fiber (TDF) content greater than 15% as measured by AOAC 991.43 and a water holding capacity greater than three parts water per part fiber as measured by AACC 56-30;

wherein the highly refined cellulose fiber mass was subjected to high shear after the cellulose mass was heated for more than 15 minutes; and wherein after providing the cellulose mass of particles containing moisture having number average particle diameter of between 0.25 and 1.9 cm and having a moisture content of less than 80% water for the cellulose mass, during the entire method, the moisture content never rises to above 80%.

* * * * *